United States Patent
Zhao et al.

(10) Patent No.: US 11,321,648 B1
(45) Date of Patent: May 3, 2022

(54) SYSTEM AND METHOD FOR INFRASTRUCTURE RESTORATION PLAN OPTIMIZATION

(71) Applicant: University of South Florida, Tampa, FL (US)

(72) Inventors: Tingting Zhao, Tampa, FL (US); Yu Zhang, Tampa, FL (US)

(73) Assignee: University of South Florida, Tampa, FL (US)

(*) Notice: Subject to any disclaimer, the term of this patent is extended or adjusted under 35 U.S.C. 154(b) by 226 days.

(21) Appl. No.: 16/110,547

(22) Filed: Aug. 23, 2018

Related U.S. Application Data

(60) Provisional application No. 62/576,018, filed on Oct. 23, 2017.

(51) Int. Cl.
*G06Q 10/06* (2012.01)
*G06Q 50/08* (2012.01)

(52) U.S. Cl.
CPC ....... *G06Q 10/06313* (2013.01); *G06Q 50/08* (2013.01)

(58) Field of Classification Search
None
See application file for complete search history.

(56) References Cited

U.S. PATENT DOCUMENTS 9,188,453 B2 11/2015 Ball et al.
2016/0275404 A1* 9/2016 Abraham ............... G06Q 10/20

OTHER PUBLICATIONS

"A novel algorithm for area traffic capacity control with elastic travel demands"; Chiou, Suh-Wen; Applied Mathematical Modelling 35.2:pp. 650-666. Elsevier Inc. (Feb. 1, 2011) (Year: 2011).*
"Multimodal Urban Transportation Pricing Theory (Project Evaluation, Demand Projection"; DOI, Masayuki; University of Pennsylvania, ProQuest Dissertations Publishing, 1986. 8623986. (Year: 1986).*
Developing a model for measuring the resilience of a port-hinterland container transportation network Hong Chen, Kevin Cullinane, Nan Liu; Transportation Research Part E 97 (2017) 282-301.*
"Identifying critical disruption scenarios and a global robustness index tailored to real life road networks" Saeed Asadi Bagloee, etal; Transportation Research Part E 98 (2017) 60-81.*
"Urban Resilience: A Civil Engineering Perspective" Anna Bozza, etal; Sustainability 2017, 9, 103; doi:10.3390/su9010103 www.mdpi.com/journal/sustainability.*
"Framework of Calculating the Measures of Resilience (MOR) for Intermodal Transportation Systems" Li Zhang, etal; Technical Report • Jul. 2010, Mississippi Transportation Research Center Report No. FHWA/MS-DOT-R D-10-220.*

(Continued)

*Primary Examiner* — Leland Marcus
(74) *Attorney, Agent, or Firm* — Molly L. Sauter; Smith & Hopen, P.A.

(57) ABSTRACT

A system and method for transportation infrastructure restoration, assuming limited budget constraints and considering unmet demand in the system for maximizing transportation system resilience is provided.

20 Claims, 5 Drawing Sheets

(56) References Cited

OTHER PUBLICATIONS

Probabilistic post-earthquake restoration process with repair prioritization of highway network system for disaster resilience enhancement Tsutomu Nifuku, PhD Dissertation, Civil Engineering Department, University of California, Irvine; 2015.*

Characterizing multi-event disaster resilience ChristopherW. Zobel, etal; Computers & Operations Research 42 (2014) 83-94.*

"Resilience-based risk mitigation for road networks" Weili Zhang, et al; Structural Safety 62 (2016) 57-65.*

Travel time resilience of roadway networks under disaster Reza Faturechi, et al; Transportation Research Part B 70 (2014) 47-64.*

"Assessing the Vulnerability of Transportation Network System" Hwang, Ha. State University of New York at Buffalo, ProQuest Dissertations Publishing, Jul. 27, 2017. 10280570.*

Evaluation of transportation network reliability during unexpected events with multiple uncertainties Soltani-Sobh, Ali; Heaslip, Kevin; Stevanovic, Aleksandar; El Khoury, John; Song, Ziqi. International Journal of Disaster Risk Reduction 17: 128-136. Elsevier. (Aug. 2016).*

Transportation system modeling and applications in earthquake engineering Chang, Liang. ProQuest Dissertations and Theses ProQuest Dissertations Publishing. (2010).*

Fragile networks: identifying vulnerabilities and synergies in an uncertain age Nagurney, A, Qiang, Q; Intl. Trans. in Op. Res. 19 (2012) pp. 123-160.*

Probabilistic post-earthquake restoration process with repair prioritization of highway network system for disaster resilience enhancement Tsutomu Nifuku; PhD Dissertation, University of California, Irvine; 2015.*

Sheffi et al., Urban transportation networks: Equilibrium Analysis with Mathematical Programming Methods. Massachusetts Institute of Technology. Prentice Hall. 1985. 1-415.

Nagurney. Building Resilience into Fragile Transportation Networks in an Era of Increasing Disasters. In 90th Annual Transportation Research Board Meeting, 2011: 1-62.

Zhang. An Active-set Algorithm for Discrete Network Design Problems. Transportation and Traffic Theory. 2009. Chapter 14:1-18.

Zhang et al., The framework for calculating the measure of resilience for intermodal transportation systems. No. NCIT Report# 10-05-09. 2009: 1-23.

Adams, T. M., K. R. Bekkem, and E. J. Toledo-Durán. Freight resilience measures. Journal of Transportation Engineering, vol. 138, No. 11, 2012, pp. 1403-1409.

Alderson, D. L., G. G. Brown, and W. M. Carlyle. Assessing and improving operational resilience of critical infrastructures and other systems. In Bridging Data and Decisions, Informs, 2014. pp. 180-215.

Boyce, D. E., and B. N. Janson. Discrete transportation network design problem with combined trip distribution and assignment Transportation Research: Part B, vol. 14, 1980, pp. 147-154.

Chen, L., and E. Miller-Hooks. Resilience: an indicator of recovery capability in intermodal freight transport. Transportation Science, vol. 46, No. 1, 2012, pp. 109-123.

Faturechi, R., and E. Miller-Hooks. Travel time resilience of roadway networks under disaster. Transportation research part B: methodological, vol. 70, 2014, pp. 47-64.

Faturechi, R., and E. Miller-Hooks. Measuring the performance of transportation infrastructure systems in disasters: A comprehensive review. J Infrastruct. Syst., 2015, p. 04014025.

Friesz, T. L. Transportation network equilibrium, design and aggregation: key developments and research opportunities. Transportation Research Part A: General, vol. 19, No. 5-6, 1985, pp. 413-427.

Yang. Sensitivity analysis for queuing equilibrium network flow and its application to traffic control. Mathematical and Computer modelling, vol. 22, No. 4-7, 1995, pp. 247-258.

Henry, D., and J. E. Ramirez-Marquez. Generic metrics and quantitative approaches for system resilience as a function of time. Reliability Engineering & System Safety, vol. 99, 2012, pp. 114-122.

Losada, C., M. P. Scaparra, and J. R. O'Hanley. Optimizing system resilience: A facility protection model with recovery time. European Journal of Operational Research, vol. 217, No. 3, 2012, pp. 519-530.

Miller-Hooks, E., X. Zhang, and R. Faturechi. Measuring and maximizing resilience of freight transportation networks. Computers & Operations Research, vol. 39, No. 7, 2012, pp. 1633-1643.

Morohosi, H. Measuring the network robustness by Monte Carlo estimation of shortest path length distribution. Mathematics and Computers in Simulation, vol. 81, No. 3, 2010, pp. 551-559.

Nogal, M., A. O'Connor, B. Caulfield, and B. Martinez-Pastor. Resilience of traffic networks: From perturbation to recovery via a dynamic restricted equilibrium model. Reliability Engineering & System Safety, vol. 156, 2016, pp. 34-96.

Nogal, M., A. O'Connor, B. Martinez-Pastor, and B. Caulfield. Novel Probabilistic Resilience Assessment Framework ol Transportation Networks against Extreme Weather Events. ASCE-ASME Journal of Risk and Uncertainty in Engineering Systems, Part A: Civil Engineering, 2017, p. 04017004.

Siu, B. W., and H. K. Lo. Doubly uncertain transportation network: degradable capacity and stochastic demand. European Journal of Operational Research, vol. 191, No. 1, 2008, pp. 166-181.

Taylor, M. A. Remoteness and accessibility in the vulnerability analysis of regional road networks. Transportation Research Part A: Policy and Practice, vol. 46, No. 5, 2012, pp. 761-771.

The White House. Presidential Policy Directive—Critical Infrastructure Security and Resilience. 2013, pp. 1-18.

Nagurney, A. Building Resilience into Fragile Transportation Networks in an Era of Increasing Disasters. In 90th Annual Transportation Research Board Meeting, 2011.

Wang, X., and P. M. Pardalos. A modified active set algorithm for transportation discrete network design bi-level problem. Journal of Global Optimization, No. 1-2, 2017, p. 325-342.

Yang, H., and M. G. H. Bell. Models and algorithms for road network design: a review and some new developments. Transport Reviews, vol. 18, No. 3, 1998, pp. 257-278.

Zhang, X., E. Miller-Hooks, and K. Denny. Assessing the role of network topology in transportation network resilience. Journal of Transport Geography, vol. 46, 2015, pp. 35-45.

Mingyuan, Chen., and A. Attahiru Sule. A Network Design Algorithm Using a Stochastic Incremental Traffic Assignment Approach Transportation Science, No. 3, 1991, p. 215-224.

Adams, T., K. R. Bekkem, and V. M. Bier. Evaluating Freight Transportation Resilience on a Highway Corridor. In Transportation Research Board 90th Annual Meeting, 2011, pp. 1-15.

Vugrin, E. D., M. A. Turnquist, and N. J. Brown. Optimal recovery sequencing for enhanced resilience and service restoration in transportation networks. International Journal of Critical Infrastructures, vol. 10, No. 3-4, 2014, pp. 218-246.

* cited by examiner

SYSTEM AND METHOD FOR INFRASTRUCTURE RESTORATION PLAN OPTIMIZATION

GOVERNMENT SUPPORT STATEMENT

This invention was made with Government support under Grant Number 1638301 awarded by the National Science Foundation. The Government has certain rights in the invention.

FIELD OF INVENTION

This invention relates to systems and methodologies for transportation infrastructure restoration.

BACKGROUND OF THE INVENTION

The repair and reconstruction of transportation infrastructure systems consumes tremendous material and human cost. After disruptive events, the efficient and cost-effective repair and reconstruction of transportation infrastructure is important for the recovery of the city or community. Assuming a limited budget, it is necessary to implement a comprehensive methodology and decision-making tools to help city administrators and infrastructure management entities make decisions regarding the repair of the transportation infrastructure.

Natural or human-caused events which may cause disruptions in nearly all human-made systems are often inevitable and most of the time unpredictable, to some extent. Critical Infrastructures play a crucial role in delivering goods, materials, electricity, water and personnel within a city or between cities. There are 16 Critical Infrastructure (CI) sectors identified by Presidential Policy Directive 21 (PPD-21). CI Resilience is defined as the CI's ability to resist, absorb and adapt to disruptions and return to normal functionality. Obviously, the resilience of CIs is critical for the society to resist to, respond to and recover from a disruptive event. In the 1970s, the National Governors' Association developed a four-phase emergency management model to describe the process and to categorize policies and programs. The four phases of the emergency management model are mitigation, preparedness, response and recovery. There are more and more research works on CI resilience analysis and enhancement concerning different CI types and various emergency management phases.

Efficient operation of transportation systems is particularly important after the occurrence of disruptive events, not only during the response stage (e.g. evacuation management responding to natural catastrophe), but also at the recovery stage, as it is the supporting system for the transportation of resources, equipment and personnel that is critical for restoring other CIs. The damage to transportation infrastructures may entail significant direct or indirect costs to restoration works, to residents' daily travel and to economic activities. Nevertheless, the repair and reconstruction of transportation infrastructure systems consumes tremendous material and human cost. Taking Hurricane Katrina as an example, it was estimated that more than 32 billion was spent on the restoration of transportation infrastructures after the hurricane. Therefore, the effective planning of transportation infrastructure restoration tasks and reasonable resource allocation is of great concern for the rapid and economic recovery from disruptive events.

Accordingly, what is needed in the art is, an effective decision making methodology and system to improve system resilience during the restoration stage of a transportation system following a disruptive event.

SUMMARY OF INVENTION

In various embodiments, a transportation infrastructure restoration strategy planning system and method, with limited budget constraints, and considering unmet demand in the system for maximizing transportation system resilience is provided.

In one embodiment, a method for restoring an urban passenger transportation system following the occurrence of a disruptive event is provided. The method includes, generating a resilience measure of the urban passenger transportation system, wherein the resilience measure comprises total travel time and unmet demand in the transportation system following a disruptive event and wherein the transportation system comprises a plurality of links representing road sections and selecting one or more links of the plurality of links to restore following the disruptive event, wherein the links are selected to reduce both the total travel time and the unmet demand of the resilience measure. In the present invention, the unmet demand is determined to be driver trips that are not able to be served following the occurrence of the disruptive event.

The method further includes, applying Elastic User Equilibrium (EUE) when selecting one or more links of the plurality of links to restore, wherein the EUE considers all the drivers' response to restoring the selected one or more links when determining a route in the transportation system. The method also considers a cost efficiency for restoring the one or more selected links.

In an additional embodiment, a non-transitory computer-readable medium having computer-readable instructions stored thereon is provided. When executed by a computing device processor, the instructions cause the computing device to, generate a resilience measure of the urban passenger transportation system, wherein the resilience measure comprises total travel time and unmet demand in the transportation system following a disruptive event and wherein the transportation system comprises a plurality of links representing road sections and select one or more links of the plurality of links to restore following the disruptive event, wherein the links are selected to reduce both the total travel time and the unmet demand of the resilience measure. In the present invention, the unmet demand is determined to be driver trips that are not able to be served following the occurrence of the disruptive event.

The instructions further cause the computing device to, apply Elastic User Equilibrium (EUE) when selecting one or more links of the plurality of links to restore, wherein the EUE considers all the drivers' response to restoring the selected one or more links when determining a route in the transportation system. The instructions further cause the computing device to consider a cost efficiency for restoring the one or more selected links.

In an additional embodiment, a system for restoring a transportation system infrastructure following the occurrence of a disruptive event is provided. The system includes, a processor and a non-transitory computer-readable medium operably coupled to the processor, the computer-readable medium having computer-readable instructions stored thereon. When executed by the processor, the system is operated to generate a resilience measure of the urban passenger transportation system, wherein the resilience measure comprises total travel time and unmet demand in the transportation system following a disruptive event and wherein the transportation system comprises a plurality of links representing road sections and to select one or more links of the plurality of links to restore following the disruptive event, wherein the links are selected to reduce both the total travel time and the unmet demand of the resilience measure. In the present invention, the unmet demand is determined to be driver trips that are not able to be served following the occurrence of the disruptive event.

The system further is operated to apply Elastic User Equilibrium (EUE) when selecting one or more links of the plurality of links to restore, wherein the EUE considers all the drivers' response to restoring the selected one or more links when determining a route in the transportation system. The instructions further cause the computing device to consider a cost efficiency for restoring the one or more selected links.

As such, in accordance with the various embodiments of the present invention, a new resilience measure combining both travel time and unmet demand in transportation system is provided. The resilience measure is then applied to infrastructure restoration strategy planning and a bi-level optimization model is implemented, in which the upper level problem is to select road sections and allocate resources (inputs for lower level problem) for maximizing the resilience measure and the lower level problem is to obtain network-flow assignment (inputs for upper level problem) based on Elastic User Equilibrium. In one embodiment, the upper and lower level problems are solved by the modified active set algorithm and the network representation method.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
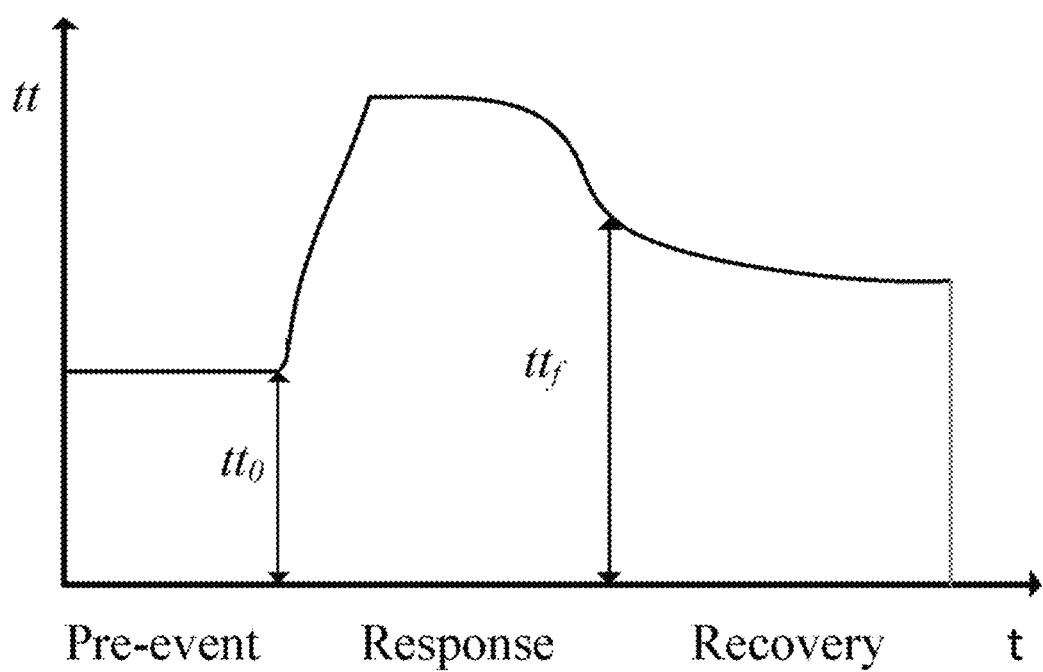
FIG. 1 is an illustration of the travel time based resilience measures, wherein, $tt_0$, $tt_f$, are total travel times at the end of pre-event and response stages, respectively, wherein the resilience measure is defined regarding the different phases, including pre-event, response and recovery.

In various embodiments, a novel system and method for a resilience measure, involving both travel time and unmet demand in a transportation system is provided. The proposed resilience measure is then applied to an infrastructure restoration strategy planning after the occurrence of a disruptive event.

In the present invention, a bi-level optimization model in presented, wherein an upper level problem is used to optimize road section selection and resource allocation, and a lower level problem, based on an Elastic User Equilibrium model, is applied to model traveler behavior and to get network-flow assignment as input to the upper level problem. The upper and lower level problems are solved by the modified active set algorithm and the network representation method derived from Network Design Problems, respectively. Then, the restoration planning method is applied in a typical road network (Sioux-Falls network) to verify the effectiveness and flexibility of this method. With multiple random disruptions in the experiment system, enormous combinations of damaged links are generated. The analyses provided by the present invention, may be of great help for decision makers, not only in the restoration stage but also for identifying critical road section sets requiring more attention for maintenance.

To propose decision-making methods acting as force multipliers for effective system restoration, the first step is to measure system resilience quantitatively. According to key parameters utilized, system resilience performance measures can be categorized into four classes: travel time/distance related, throughput/capacity related, accessibility related, and topological measures. Among these four classes, travel time/distance related measures are most widely applied in existing literature, while accessibility related are least studied. The disruptive event, such as an earthquake, flood or malicious acts, could lead to capacity degradation for some links and even complete cutoff for others. Consequently, this leads to an increase in travel time for some travelers compared to their regular travel before the disruptive events. Furthermore, due to capacity degradation or loss, partial travel demand may not be able to be served by the devastated road network, a.k.a unmet demand. The unmet demand has more a serious impact on travelers, regulatory agencies and industry entities. However, this factor is not properly considered or not included in most resilience measures. In the present invention, a novel transportation resilience measure combining mobility (travel time) and the unmet demand within the devastated road network is provided.

In various embodiments, the restoration plan problem of a transportation system after a disruption by a bi-level optimization problem is analyzed using the system and method of the present invention. Different road sections lead to different resource consumption for the restoration task. The restoration tasks can be categorized as repair tasks for road sections with degraded capacities and reconstruction tasks for road sections that are completely destroyed. Both repair and reconstruction tasks can have multiple capacity recovery levels corresponding to various resource consumption. The objective of upper level problem is to maximize the system resilience with the restoration road section selection and capacity recovery level, i.e. resource allocation, as control variables. The upper level problem is formulated as a multi-mode resource constrained project-planning problem. The lower level problem is used to depict the road users' travel behavior after the event. Given aftermath degraded roadway network, the normal equilibrium is disrupted with partial travel demand that can not be accommodated by the devastated road network. An Elastic User Equilibrium (EUE) traffic assignment problem is applied to depict this circumstance and provide network-flow results as inputs for the upper-level problem.

As mentioned, four classes of performance measurements are usually taken to quantify transportation system resilience with few consideration of travel demand that cannot be served after a disruptive event. Among these four classes, travel time/distance related measures are most widely applied in existing literature. For instance, resilience has been defined as the network's ability to resist and adapt to disruption with total travel time employed in assessing system resilience. As illustrated in FIG. 1, system resilience can be measured by the travel time resilience, $R_{T,B}$, which has been formulated as the reciprocal of total travel time at the end of the response stage divided by the reciprocal of the total travel time at the time just before the event happened. The system resilience optimization methods with the object to maximize travel time related measures have been previously proposed, which were of great help for decision makers.

However, after catastrophic events, such as floods and earthquakes, roadway performance could be seriously affected with huge capacity reduction of links and total loss of some links. There stands a good chance that partial travel demand cannot be realized. Therefore, the evaluation of network resilience performance without consideration of unmet travel demand could be biased. Previously, methods considered system resilience as the demand that can be satisfied with an upper travel time threshold for freight transportation. Nevertheless, the traffic flow assignment mechanism and the strength of capacity constraint of freight transportation are essentially different than that of generalized urban transportation systems. In addition, prior works have analyzed the impact of demand variation on transportation network resilience. However, the system resilience in these works was quantified by the travel time increased and the traffic flow variations in the system without involving unmet travel demand in the system.

In summary, there has been quite a few studies in infrastructure system resilience. Nevertheless, the popular used resilience measurement does not take unmet demand into consideration and could lead to biased restoration results following a disruptive event. Although some researchers proposed to consider unmet demand in freight transportation, the setting and modeling are different from what should be in an urban passenger transportation system. Therefore, what is needed is a more realistic measure to indicate system resilience performance for modeling and solving restoration-planning problem after disruptive events.

To some extent, the Restoration Strategy Plan (RSP) problem is a type of network design problem under special situations. The objective of typical Network Design Problems (NDP) is to make an optimal investment decision in order to optimize a given system performance measure such as the total travel cost in the network, while accounting for the route choice behavior of network users. Due to the complexity of problem formulation and computational challenges, NDP has been recognized as one of the most difficult problems in the transportation field. However, as NDP has great potential to be applied to solve planning, designing and even congestion pricing problems, it has drawn abundant efforts.

The NDP has been classified in two different forms: a discrete one concerning the additions of new links to an existing road network, and a continuous one concerning the optimal capacity expansion of existing links. The Discrete Network Design Problem (DNDP) is modeled as a nonlinear integer programming model, constrained with network equilibrium. Typical DNDP solution algorithms include Bender's decomposition, branch-and-bound methods and heuristics. Prior work has proposed an active set approach to solve Discrete Network Design problem with the assumption that the capacity increase and construction cost of each road were based on the number of lanes. Other work has considered a more general case that specified the cost of capacity increase and construction of each candidate road section based on a modified active set algorithm.

From the similarity side, as the road section capacities are decreased after an earthquake, flood or hurricane, the imbalance between network wide transportation service supply and travel demand stands out. This is similar to the imbalance between transportation service supply and travel demand considering the economic growth and land use relocation in NDP. Although the cause for the imbalance is different, the inherent mechanism to understand the problem and the optimization methodologies to formulate the problem could be leveraged.

From the difference side, firstly, as previously mentioned, the cause of the imbalance between transportation service supply and travel demand is different. Consequently, the magnitude of the short-term impact of natural disasters to the network could be much more significant than the impact of economic growth and land use relocation. Moreover, as the objective of RSP is to recover from catastrophic events, it is more important to provide a fairness-based solution to reduce not only the total travel time but also the unmet demand in RSP problem. In a word, to provide a decision making methodology considering the balance between efficiency and equity is a great challenge for RSP problem. The equity aspect is introduced by system level unmet demand after a disruptive event in the present invention. Due to sudden capacity degrade or loss, partial travel demand may not be able to be served by the devastated road network. Therefore, one basic equity concern of the restoration work is to reduce the unmet demand in the system.

As previously mentioned, there is insufficient research involving unmet demand in resilience analysis to draw firm conclusions about how to improve the system resilience. To address this problem, a novel transportation resilience measure combining mobility (travel time) and the unmet demand within the devastated road network together is proposed, as follows.

$$R = \frac{1}{1+\alpha} \sum_a x_a^* \cdot t_a(x_a^*, c_a) + \frac{\alpha}{1+\alpha} \sum_{rs} \hat{D}_{rs} \qquad (0.1)$$

where $$\sum_a x_a^* \cdot t_a(x_a^*, c_a)$$

defines the total travel time in the system, $$\sum_{rs} \hat{D}_{rs}$$

defines the total unmet demand in the system. The unmet demand is quantified by the elastic demand traffic assignment model that will be elaborated later. In Equation 1.1, $\alpha$ is the user defined weight for the tradeoff between travel time and unmet demand.

Taken the proposed resilience measure as the objective function, the restoration plan optimization after a disruptive event is formulated as a bi-level optimization problem. Bi-level optimization is also known as the Stackelberg leader follower problem, which represents a situation involving two decision makers and each decision maker's behavior influences the other's choice. In this problem, the upper level decision maker is a city administrator who decides which road sections to be repaired or reconstructed after the event, given a limited budget. The lower level decision makers are road users who are affected by road network capacity degradation or link lost due to the event. Evidently, the restoration plan directly changes the network connection and road capacity. This will alter the network-wide level of service that will influence the traveler's decision making. Meanwhile, the travelers' decisions will lead to traffic flow assignment result on the restored transportation network, which ultimately determines the system performance after restoration. Therefore, bi-level optimization problem is appropriate for modeling restoration strategy planning problem. The formulation of the restoration plan optimization problem is illustrated as follows.

Upper Level Problem:

$$\min_{y} \left( \frac{1}{1+\alpha} \sum_{a} x_a^* \cdot t_a(x_a^*, c_{a,0} + c_{a,1} y_{a,1} + c_{a,2} y_{a,2}) + \frac{\alpha}{1+\alpha} \sum_{rs} \hat{D}_{rs} \right) \quad (0.2)$$

$$\text{s.t.} \sum_{a \in \overline{A}} M_{a,1} \cdot y_{a,1} + M_{a,2} \cdot y_{a,2} \leq B \quad (0.3)$$

$$y_{a,1} + y_{a,2} \leq 1, \forall a \in \overline{A} \quad (0.4)$$

$$y_{a,p} \in \{0, 1\}, \forall a \in \overline{A}, p = 1, 2 \quad (0.5)$$

where, $\quad (0.6)$ $$x_a^* = \operatorname{argmin} \sum_{a} \int_0^{x_a} t_a(\omega, c_{a,0} + c_{a,1} y_{a,1} + c_{a,2} y_{a,2}) d\omega -$$

$$\sum_{rs} \int_0^{x_a} D_{rs}^{-1}(\omega) d\omega$$

$$\sum_{rs} \hat{D}_{rs} = \sum_{rs} f_{rs,p} \quad (0.7)$$

Lower level problem:

$$\min \sum_{a} \int_0^{x_a} t_a(\omega, c_{a,0} + c_{a,1} y_{a,1} + c_{a,2} y_{a,2}) d\omega - \sum_{rs} \int_0^{q_{rs}} D_{rs}^{-1}(\omega) d\omega \quad (0.8)$$

$$\text{s.t.} \sum_{rs} f_{rs,k} = q_{rs} \forall r, s \quad (0.9)$$

$$f_{rs,k} \geq 0 \quad \forall k, r, s \quad (0.10)$$

-continued $$q_{rs} \geq 0 \quad \forall r, s \quad (0.11)$$

$$x_a = \sum_{rs} \sum_{k} f_{rs,k} \delta_{a,k}^{rs}, \forall a \quad (0.12)$$

The objective function, referring to equation (0.2), of the upper level problem is to minimize the system resilience measurement (higher resilience measurement indicate lower resilience performance). The total budget for the whole restoration plan is restricted in constraint (0.3). Constraints (0.4) and (0.5) guarantee that for each candidate link, either restoration work with higher (level 1) or lower (level 2) is adopted (when $y_{a,1} + y_{a,2} = 1$) or no action is taken (when $y_{a,1} = 0$, $y_{a,2} = 0$). $t_a(x_a, c_a)$ in equation (0.2) is the travel time function.

The Bureau of Public Roads (BPR) function is adopted as the travel time function:

$$t_a(x_a, y_a) = t_a^0 \left\{ 1 + 0.15 \left[ \frac{x_a}{c_a^0 + c_{a,1} y_{a,1} + c_{a,2} y_{a,2}} \right]^4 \right\} \quad (0.13)$$

Equation (0.12) relates the link flows to the path flows through the link-path incidence matrix. In summary, Table 1 lists the notations used in the bi-level problem formulation.

TABLE 1

| | Notations in the bi-level problem formulation $c_{a,00}$ |
|---|---|
| a | Link index |
| $x_a$ | Flow on link a; X = (..., $x_a$, ...) |
| $t_a$ | Travel time on link a; t = (..., $t_a$, ...) |
| $c_{a,00}$ | Original capacity of link a before disruptive event |
| $c_{a,0}$ | Capacity of link a at the moment after disruptive event |
| $\overline{A}_1$ | Candidate links with capacity augment level 1 |
| $\overline{A}_2$ | Candidate links with capacity augment level 2 |
| $\overline{A} = \overline{A}_1 \cup \overline{A}_2$ | All candidate links |
| $c_{a,1}, \forall a \in \overline{A}_1$ | Capacity augment for link a with level 1 |
| $c_{a,2}, \forall a \in \overline{A}_2$ | Capacity augment for link a with level 2 |
| $M_{a,1}, \forall a \in \overline{A}_1$ | Cost for link a with capacity augment level 1 |
| $M_{a,2}, \forall a \in \overline{A}_2$ | Cost for link a with capacity augment level 2 |
| $y_{a,l}, \forall a \in \overline{A}_1 \cup \overline{A}_2, l = 1, 2$ | Binary variables, 1 indicate the corresponding plan is adopted, 0 means not |
| N | Node (index) set |
| A | Arc (index) set |
| $K_{rs}$ | Set of paths connecting O-D pair r − s; r ∈ ℜ, s ∈ Ψ |
| $f_{rs,k}$ | Flow on path k connecting O-D pair r − s; $f^{rs} = (..., f_k^{rs}, ...); f = (..., f^{rs}, ...)$ |
| $t_{rs,k}$ | Travel time on path k connecting O-D pair r − s; $c^{rs} = (..., c_k^{rs}, ...); c = (..., c^{rs}, ...)$ |
| $q_{rs}$ | Trip rate between origin r and destination s; $(q)_{rs} = q_{rs}$ |
| $\delta_{a,k}^{rs}$ | $\delta_{a,k}^{rs} = \begin{cases} 1 & \text{if link } a \text{ is on path } k \text{ between } O\text{-}D \text{ pair } r\text{-}s \\ 0 & \text{otherwise} \end{cases}$ $(\Delta^{rs})_{a,k} = \delta_{a,k}^{rs}; \Delta = (..., \Delta^{rs}, ...)$ |
| $u_{rs}$ | Minimum travel time between r and s |
| $D_{rs}^{-1}(\cdot)$ | Demand function between r and s |
| $D_{rs}(\cdot)$ | Inverse demand function between r and s s |
| r | Origin node index |
| s | Destination node index |
| $t_{rs,p}$ | The travel time on the pseudo link |

TABLE 1-continued

Notations in the bi-level problem formulation $c_{a,00}$

| | |
|---|---|
| $f_{rs,p}$ | The flow on the pseudo link between O-D pair r – s |
| $\overline{D}_{rs}$ | Total demand between OD pair r, s before the special event |
| $\hat{D}_{rs}$ | Unmet demand between OD pair r, s |

For the lower level problem, in order to quantify the unmet travel demand, the Elastic-demand User Equilibrium (EUE) was applied as a model to depict the traveler's route choice behavior.

Traditionally, the NDP models assumed that the travel demand is given and fixed, and the driver's route choice behavior is characterized by a user equilibrium (UE) problem. The UE with fixed demand can be formulated as follows.

$$\min z(x, q) = \sum_a \int_0^{x_a} t_a(\omega)d\omega \qquad (0.14)$$

$$\text{s.t.} \sum_k f_k^{rs} = q_{rs} \; \forall \, r, s \qquad (0.15)$$

$$f_k^{rs} \geq 0 \; \forall k, r, s \qquad (0.16)$$

$$q_{rs} \geq 0 \; \forall r, s \qquad (0.17)$$

However, as the NDP generally involves long-term investment made in a road network and consequently influences the travel demand in the system, the assumption that travel demand is given and fixed is not realistic. Therefore, the typical EUE model stems from the intention to incorporate the elasticity of travel demand into the NDP. In the EUE model, the travel demand between an O-D pair is varying with the travel cost between that O-D pair under user equilibrium, which is depicted by a demand function. The equilibrium travel demands between all O-D pairs and their traffic flow distribution on the network under a given capacity expansion plan can be obtained by solving the elastic-demand UE model.

In the present invention, the EUE model is used to depict traveler's route choice behavior before and after the disruptive event. As the event leads to large scale or severe degradation of road capacities within a short time period, significant imbalance between travel demand and network capacity supply stands out. Moreover, the travelers are more sensitive to road restoration status in the system within the RSP context. Therefore, there are plenty of demand elasticity in RSP problem, although the time scale of RSP is relatively shorter than that of NDP. Hence, EUE is appropriate to model the rebalance process under the restoration plan determined by the upper level problem.

The lower level objective function of the RSP problem is EUE model as shown in Equation (0.8) $D_{rs}^{-1}(.)$ is the inverse of the monotonically decreasing demand function $D_{rs}(.)$ between O-D pair r-s, $q=(\ldots, q_{rs}, \ldots)$. More details about how to define the Demand Function and the Inverse Demand Function are illustrated later in Equation (0.18) and Equation (0.19).

The demand function $D_{rs}(.)$ relates the number of trips $D_{rs}$ to the minimum travel time $u_{rs}$ on the road network between r and s. The Elastic Exponential Demand Function has been adopted as:

$$D_{rs} = D_{rs}^0 \exp(\beta(u_{rs}/u_{rs}^0 - 1)) \qquad (0.18)$$

$D_{rs}^0$ and $u_{rs}^0$ are defined as the travel demand and travel cost (minimum travel time) between OD pair r, s at a referencing scenario. The cost matrix is defined as costs with units of seconds. In typical elastic traffic assignment model, it is widely accepted to select the $(D_{rs}^0, u_{rs}^0)$ at the base year where the demand matrix, road network topology and link capacities are known and the costs are acquired by user equilibrium accordingly. Thus, $(D_{rs}^0, u_{rs}^0)$ lies on both the supply curve and the demand curve. Accordingly, $(D_{rs}^0, u_{rs}^0)$ is selected as the corresponding variables at user equilibrium before the event happens.

Accordingly, the Inverse Demand Functions can be defined as:

$$u_{rs} = u_{rs}^0 + (u_{rs}^0/\beta)\ln(D_{rs}/D_{rs}^0) \qquad (0.19)$$

A network representation method is proposed to solve the Elastic-demand UE problem. The traditional UE problem can be efficiently solved by the Frank-Wolfe method. Two different network representations that can be applied to transform the EUE problem to an equivalent traditional UE problem include, the zero-cost overflow formulation and the excess-demand formulation as illustrated in FIG. 2(b) and FIG. 2(c), respectively.

Figure 2:
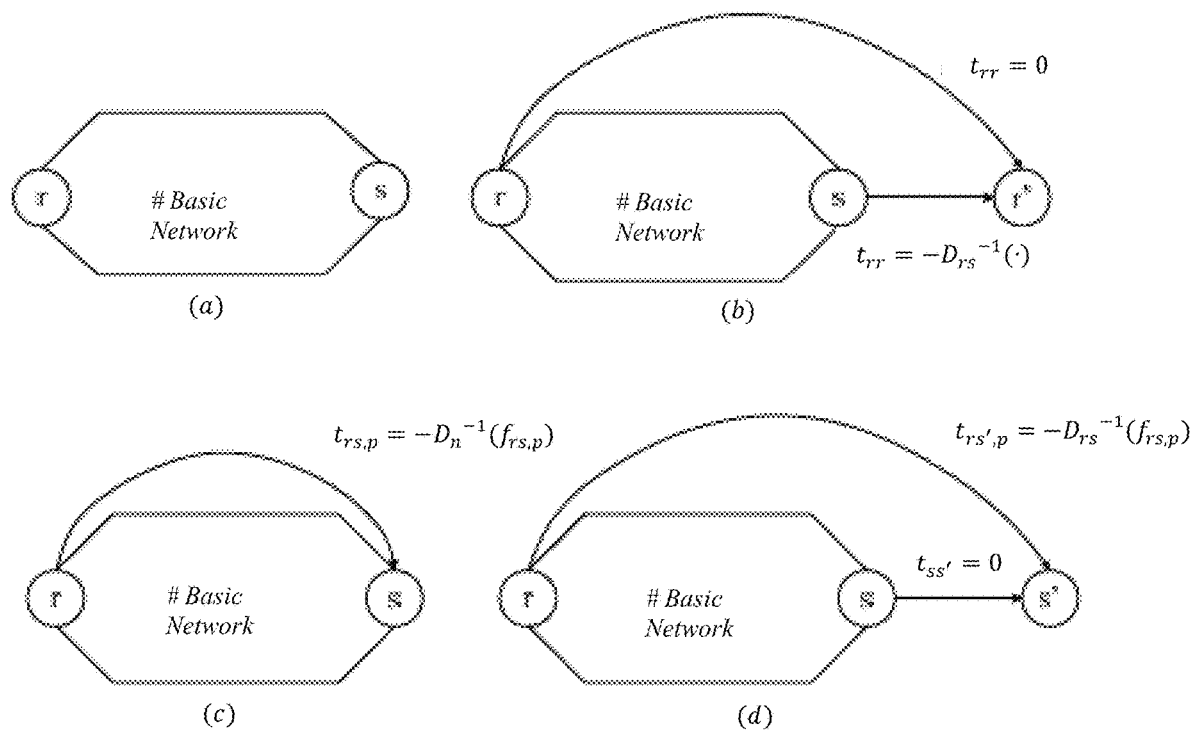
FIG. 2 is an illustration of the network representations (a) the basic network; (b) the added node and links for O-D pair r-s in zero-cost overflow network representation; (c) the excess-demand network representation for O-D pair r-s; (d) modified excess-demand network representation, in accordance with an embodiment of the present invention.

For the zero-cost overflow formulation, FIG. 2(b) shows a modification of the basic network in which every O-D pair is augmented to include a "dummy" destination node (designated r' in FIG. 2(b)).

For the excess-demand formulation, the variable $f_{rs,p}$ denotes the excess demand, that is trips not accommodated between origin r and destination s $f_{rs,p} = \overline{D}_{rs} - D_{rs}(u_{rs})$. In this network representation, a pseudo link carrying the flow $f_{rs,p}$ is defined which directly connecting the origin to the destination for each O-D pair as shown in FIG. 2(c).

The excess-demand network representation is more straightforward for the quantification of unmet demand in the system in the context of resilience analysis in the present invention. However, if there already is a link connecting the origin to the destination for an O-D pair, it is necessary to distinguish the origin link $a_{rs}$ and the pseudo link $a_{rs,p}$. Therefore, a "dummy" destination node is proposed (designated s' in FIG. 2(d)) for the excess-demand network representation. The new network representation, named modified excess-demand network representation, is illustrated in FIG. 2(d).

Therefore, the pseudo link cost-flow function is defined as follows to relate the cost $u_{rs,p}$ on the pseudo link to its flow $f_{rs,p}$.

$$u_{rs,p} = u_r^0 + (u_{rs}^0/\beta)\ln((\overline{D}_{rs} - f_{rs,p})/D_{rs}^0) \qquad (0.20)$$

where $\overline{D}_{rs}$ is the total demand between OD pair r, s before the special event. $D_{rs}^0$ is a referencing point on the demand function, which is also chosen as the total demand between OD pair r, s before the special event. Therefore the $\overline{D}_{rs}$ and $D_{rs}^0$ have the same value. However, this is not always the case for all the elastic traffic assignment problem under more generalized circumstances with variable total demand between OD pair r, s in different time periods.

With the network representation and the link cost-flow function (i.e. inverse demand function) defined for the pseudo links, the EUE problem could be solved using a Frank-Wolfe algorithm.

The modified active set algorithm is applied to solve the upper-level optimization problem. A binary variable $y_{a,l}$, $\forall a \in \overline{A}_1 \cup \overline{A}_2$, $l=1, 2$ is introduced to denote the control variable in the upper level problem. $y_{a,l}=0$ indicate the corresponding plan is adopted, $y_{a,l}=0$ otherwise, where a is the link index to perform this restoration and l is the indicator of resource allocation. l=1 indicates restoration work with higher level resource and more capacity augmented (or constructed), l=2 indicates lower level resource assignment.

Then, all binary variables $y_{a,l}$ are classified into two active sets:

$$\Omega_0 = \{(a,l): y_{a,l}=0\} \quad (0.21)$$

$$\Omega_1 = \{(a,l): y_{a,l}=1\} \quad (0.22)$$

The restoration work plan can be represented by these two active sets. Changing one or several (a,l) from $\Omega_0$ to $\Omega_1$ indicates the change of restoration work plan. Then, the constraints (0.4) and (0.5) of the upper level problem can be transformed to:

$$y_{a,l}=0, \forall (a,l) \in \Omega_0 \quad (0.23)$$

$$y_{a,l}=1, \forall (a,l) \in \Omega_1 \quad (0.24)$$

Then $g_{a,l}$ and $h_{a,l}$ are introduced to alter the representation of restoration work plan, $\Omega_0$ and $\Omega_1$. $g_{a,l}=1$ means shifting (a,l) from $\Omega_0$ to $\Omega_1$, $h_{a,l}=1$ means shifting (a,l) from $\Omega_1$ to $\Omega_0$. Then, the change of the upper level objective function is estimated by the following expression.

$$\sum_{(a,l) \in \Omega_0} \lambda_{a,l} g_{a,l} - \sum_{(a,l) \in \Omega_1} \mu_{a,l} h_{a,l} \quad (0.25)$$

where $\lambda_{a,l}$ and $\mu_{a,l}$ are the multipliers corresponding to constraints $y_{a,l}=0$ and $y_{a,l}=1$ respectively. $\lambda_{a,l}$ and $\mu_{a,l}$ can be calculated through:

$$\begin{cases} y_{a,l}=0: \lambda_{a,1}=R'-R & \mu_{a,l}=0 \\ y_{a,l}=1: \lambda_{a,1}=0 & \mu_{a,l}=R-R' \end{cases} \quad (0.26)$$

where R is the value of upper level objective function before the change of $\Omega_0$ and $\Omega_1$. R' is the objective function value after the change indicated by $g_{a,l}$ and $h_{a,l}$.

After getting all the feasible $(g_{a,l}, h_{a,l})$ pairs subject to the constraints (0.3)~(0.5) and corresponding change of upper level objective function estimated by (0.25), the $g_{a,l}$ and $h_{a,l}$ to reduce the resilience measure can be found. Then, the active sets $\Omega_0$ and $\Omega_1$ leading to minimized upper level objective function can be calculated iteratively. More details about the implementation procedure and the pseudo code of the modified active set algorithm can refer to the reference about the modified active set algorithm.

The following numerical examples are provided to demonstrate the validity, capability, and flexibility of the proposed bi-level optimization model for solving the restoration plan. In these exemplary embodiments, the restoration plan method is applied in a typical road network (Sioux-Falls network) to illustrate the implementation procedures and to verify the effectiveness of this method.

Figure 3:
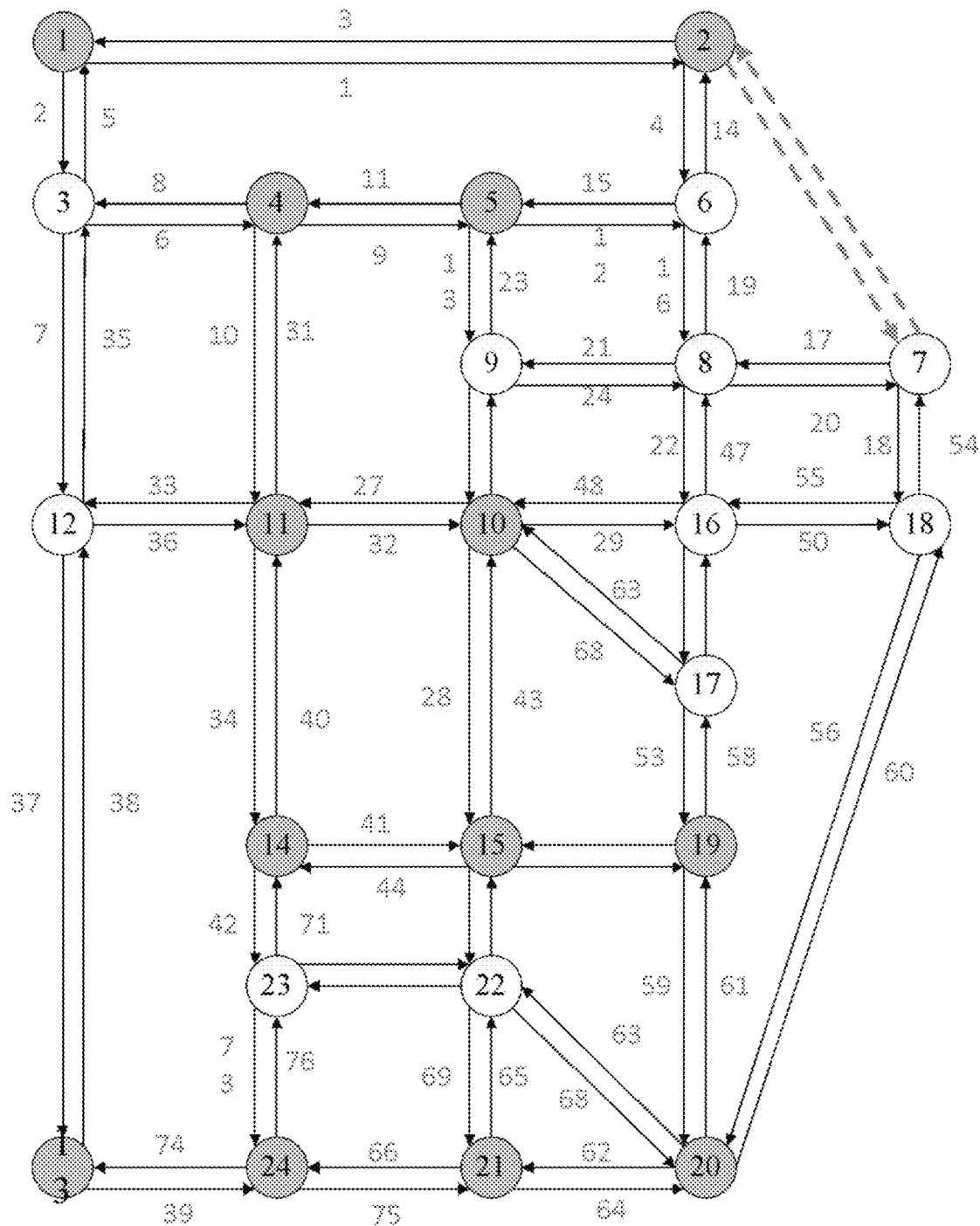
FIG. 3 is an illustration of Sioux-Falls network topology, in accordance with an exemplary embodiment of the present invention.

The Sioux Falls network is composed of 24 nodes and 76 links. As the topology shows in FIG. 3, 14 nodes marked green are serving as both origins (O) and destinations (D) in the system. In total, the network has 182 O/D pairs and the O-D trip matrix could refer to Table 2. The link capacity and free-flow travel time before the disruptive event could refer to Table 1.

The Sioux Falls network is a relatively complex network among the typical networks used in existing literature. There could be many different combinations of damaged links. To generate experiments while reserving the diversity of the combinations of damaged links', first a subset of links from three different categories, edge link, links in the central area of the network, and links connecting the edge and the central area are randomly selected. Thus, 15 links (Link Index [1, 2, 26, 27, 36, 37, 56, 60, 4, 14, 39, 11, 13, 17, 31]) are chosen as the subset, potential damaged links in the system, with 6 links (Link Index [1, 2, 37, 39, 56, 60]) at the edge of the network, 5 links (Link Index [11, 13, 31, 26, 27]) at the central area of the network, and 4 links (Link Index [4, 14, 17, 36]) connecting the edge and the central area of the network. This selection of potential damaged links makes it possible to generate different types of disruptive events. Given that hurricane or sea level rise tends to induce capacity degradation at the edge of the network, earthquakes tend to cause collective disruption, and floods could affect a more disperse area. For each experiment case, $N_{dam}$ links are randomly selected from the above-mentioned 15 links. After the disruptive event, the capacity of selected link (s) is assumed to be decreased to ⅓ of the original link capacity. In other words, the damaged links are selected randomly while the capacity deterioration ratio is deterministic in this work. The reason is that, the combination of the damaged links is of more concern regarding to the resilience measurement of the system after the event. Considering different damage levels could be an important direction for future works.

For the candidate restoration plans, there are $N_{dam}$ links to be repaired with two levels of resource expenditure as presented in Table 2. In addition, two paired links as candidate links to be constructed after the event could refer to A #1 and A #2 in Table 3. This configuration enables verification of flexibility of the restoration plan optimization method discussed below.

Furthermore, in order to examine system resilience with different number of damaged links, 5 experiments with $N_{dam}=1\sim5$, respectively, were performed. The system resilience measure before and after the restoration of infrastructure, and the corresponding cost for the plan are examined in detail.

TABLE 2

Potential damaged links and their repair costs

| Link | Free-flow travel time (min) | Capacity ($10^3$veh/h) | Cost1 | Increased Capacity1 | Cost2 | Increased Capacity2 |
|---|---|---|---|---|---|---|
| 1 | 3.6 | 6.02 | 8 | 6.02 | 4 | 4.01 |
| 2 | 2.4 | 9.01 | 8 | 9.01 | 4 | 6.01 |
| 4 | 3 | 15.92 | 14 | 15.92 | 7 | 10.61 |
| 11 | 1.2 | 46.85 | 32 | 46.85 | 16 | 31.23 |
| 13 | 3 | 10.52 | 10 | 10.52 | 5 | 7.01 |
| 14 | 3 | 9.92 | 10 | 9.92 | 5 | 6.61 |
| 17 | 1.8 | 15.68 | 12 | 15.68 | 6 | 10.45 |
| 26 | 1.8 | 27.83 | 20 | 27.83 | 10 | 18.55 |
| 27 | 3 | 20 | 16 | 20 | 8 | 13.33 |
| 31 | 3.6 | 9.82 | 10 | 9.82 | 5 | 6.55 |
| 36 | 3.6 | 9.82 | 10 | 9.82 | 5 | 6.55 |
| 37 | 1.8 | 51.8 | 34 | 51.8 | 17 | 34.53 |
| 39 | 2.4 | 10.18 | 10 | 10.18 | 5 | 6.79 |
| 56 | 2.4 | 8.11 | 8 | 8.11 | 4 | 5.41 |
| 60 | 2.4 | 8.11 | 8 | 8.11 | 4 | 5.41 |

The most disruptive damaged link sets and most cost effective ones are identified according to the numerical experiment results. Furthermore, the statistical analysis of the resilience measures before and after the restoration work, and the cost efficiencies of the restoration plan are performed. These analysis helps one to better understand the resilience measure, to verify the effectiveness of the proposed method and to identify critical road sections need more concern for maintenance and preparedness before events.

For $N_{dam}=1~5$, the resilience measure is calculated before ($R_0$) and after the restoration work ($R_f$), the cost of the plan M, and the cost efficiency E of the plan defined as follows.

$$E = \frac{R_0 - R_f}{M} \qquad (0.27)$$

The unmet demand in the system is calculated by Equation (0.28)

$$\hat{D} = \sum_{rs} \hat{D}_{rs} \sum_{rs} f_{rs,p} \qquad (0.28)$$

The results for $N_{dam}=1~5$ are presented in Table 3. Link indexes for $\hat{D}_{max}$ indicate the links that lead to maximum unmet demand in the system after their destruction. These links should draw more attention for the regulatory agencies to make road maintenance and preparedness plans before the disruptive events. Therefore, Link 2, Link 4, Link 14, Link 1 and Link 11 are all critical sections which need to be well maintained to avoid tremendous loss of system level of service. The $\hat{D}_{max}$ increases with the number of damaged links, which also fit with common sense.

The cost efficiency provides a quantitative measure to examine descend degree of system resilience measure per cost unit. Link indexes for $E_{max}$ indicate the damaged links in the case with maximum cost efficiency. These cases are normally with above-average unmet demand before restoration but could be recovered with less cost. It is worth noting that the link indexes for $\hat{D}_{max}$ and $\hat{D}_{min}$ are relatively stable for different number of damaged links compared with those for $E_{max}$. The reason is that cost efficiency is a more comprehensive measure. It is affected by more factors including the resilience measure before and after the restoration work, and the cost of the plan.

significantly skewed right with skewness 0.7222. $R_0$ is slightly skewed left with skewness −0.1052. (The skewness s of random variable x is defined as $$s = \frac{E(x-\mu)^3}{\sigma^3}.)$$

These phenomena indicate that the resilience measure before the restoration work is more dispersive as there are various possibilities for the damaged link combination. Both the topology of the road network, the road section capacities, and OD trip matrix could influence the distribution of $R_0$. However, the resilience measure after the restoration work is more aggregated to a lower range, which verifies the effectiveness of the proposed restoration strategy plan method.

Figures 4A, 4B, 4C:
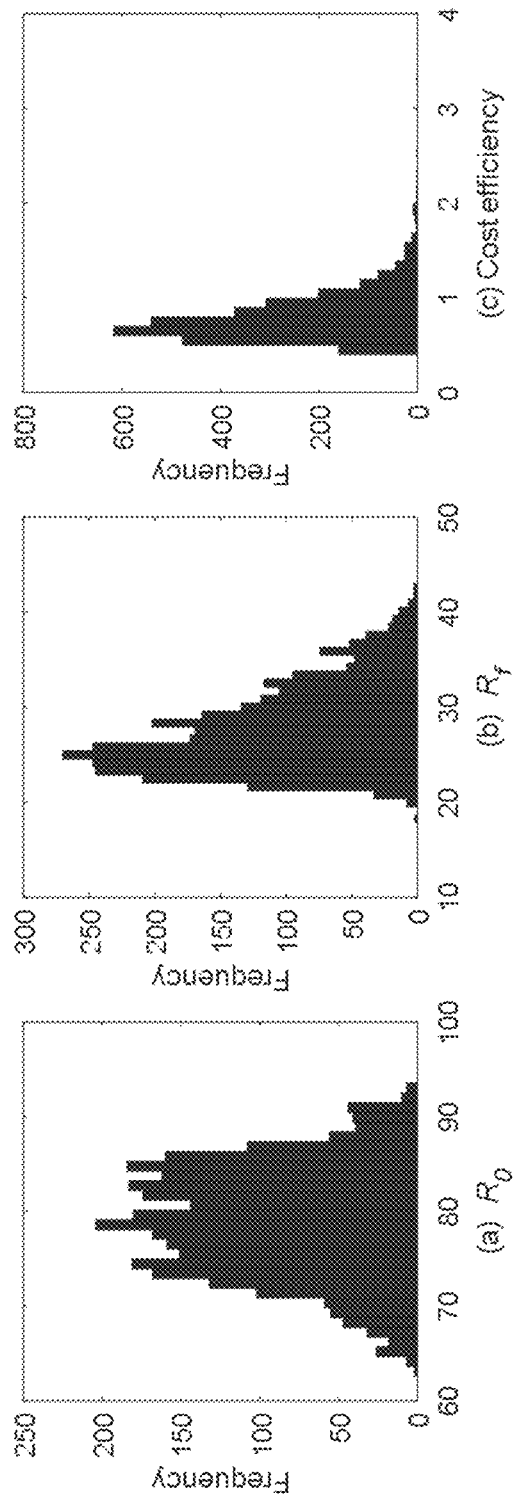
FIG. 4A is an illustration of histogram of resilience measures before the restoration work, in accordance with an exemplary embodiment of the present invention.
FIG. 4B is an illustration of a histogram of resilience measures after the restoration work, in accordance with an exemplary embodiment of the present invention.
FIG. 4C is an illustration of a histography of cost efficiency of the restoration plan for all cases with 5 damaged links, in accordance with an exemplary embodiment of the present invention.
Figure 4F:
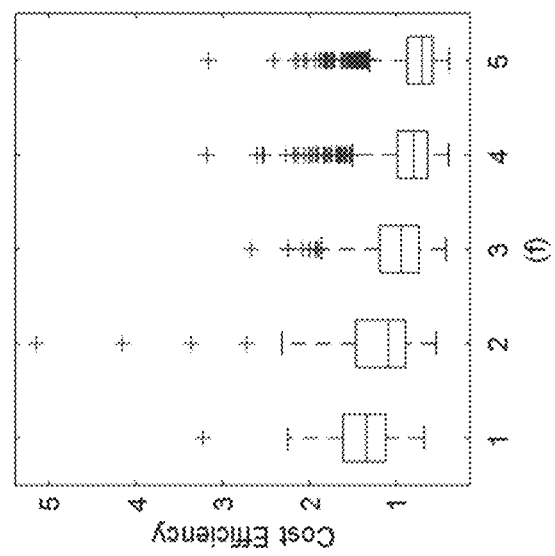
FIG. 4F is an illustration of a box plot of cost efficiencies of the restoration plan for all cases with 1~5 damaged links, in accordance with an exemplary embodiment of the present invention.
Figure 4E:
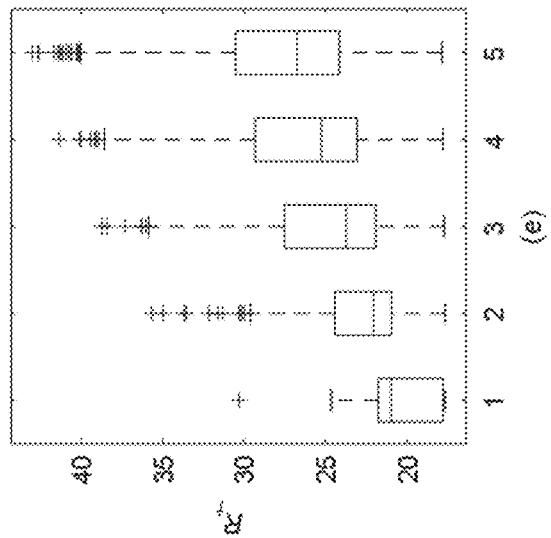
FIG. 4E is an illustration of a box plot of resilience measures after the restoration work, in accordance with an exemplary embodiment of the present invention.
Figure 4D:
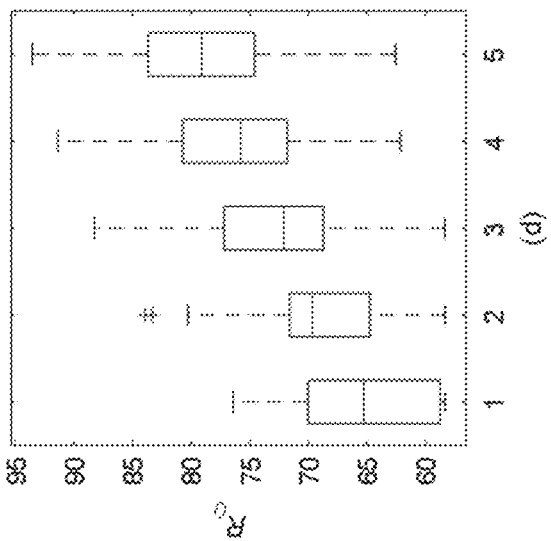
FIG. 4D is an illustration of a box plot of resilience measures before the restoration work, in accordance with an exemplary embodiment of the present invention.

The box plot for the resilience measures before and after the restoration work, and the cost efficiencies of the restoration plan with the multiple damaged links are shown in FIG. 4C, FIG. 4E and FIG. 4F. The median, upper quartile and lower quartile of $R_0$ and $R_f$ are all monotonically increasing with the increased number of damaged links. The median, upper quartile and lower quartile of cost efficiency is monotonically decreasing with the increased number of damaged links. It is worth mentioning that, when $N_{dam}=2$, the box plot for cost efficiency is relatively tall than the box plots with other $N_{dam}$ values. The maximum cost efficiency is also larger than other cases. This phenomenon indicates that when $N_{dam}=2$, the cost efficiency are more dispersive. For some damaged link combinations with $N_{dam}=2$, great resilience measure decrease could be achieved with low work plan costs. These analyses in FIG. 4A-FIG. 4F provide an option for understanding the resilience measure and restoration plan optimization problem from a statistical perspective.

For the four phases of emergency management, mitigation, preparedness, response and recovery, the last two phases are considered to be less understood by both researchers and practitioners. Transportation system is the "critical point" of the restoration of other Critical Infrastruc-

TABLE 3

Experiment results with $N_{dam} = 1 ~ 5$

| Num. of damaged links | Link# for $\hat{D}_{max}$ | $\hat{D}_{max}$ | $(R_0, R_f)$ for $\hat{D}_{max}$ | Link# for $E_{max}$ | $E_{max}$ | Link# for $E_{min}$ | $E_{min}$ |
|---|---|---|---|---|---|---|---|
| 1 | 4 | 62.31 | (76.42, 21.08) | 14 | 3.23 | 11 | 0.7017 |
| 2 | (2, 14) | 70.22 | (83.93, 26.56) | (60, 31) | 5.15 | (37, 39) | 0.5623 |
| 3 | (2, 4, 14) | 74.9 | (88.26, 21.75) | (56, 4, 17) | 2.67 | (37, 14, 11) | 0.4457 |
| 4 | (1, 2, 4, 14) | 78.29 | (91.37, 22.25) | (2, 26, 17, 13) | 3.18 | (56, 4, 13, 17) | 0.4119 |
| 5 | (1, 2, 4, 14, 11) | 80.53 | (93.56, 22.4) | (2, 37, 56, 11, 17) | 3.16 | (26, 36, 37, 13, 31) | 0.4018 |

There are $C_{15}^5=3003$ cases where 5 links were randomly selected to be damaged in the 15 candidates. FIG. 4A shows the histogram of the resilience measures before the restoration work, FIG. 4B shows the historgram of the resilience measures after the restoration work, and FIG. 4C shows the cost efficiencies of the restoration plan for all these cases. It can be observed that the spread of resilience after the restoration work ($R_f$) is more concentrated than resilience before ($R_0$). Statistically, the interquartile range (IQR), i.e. the difference between the 75th and 25th percentile of $R_0$ is 643.72 while the IQR for $R_f$ is 450.1. Moreover, $R_f$ is tures after a disruptive event. Thus, the object of this work is to provide decision-making support for effective transportation system restoration.

The first step to optimize the restoration work plan is to measure system resilience quantitatively and effectively with the parameters quantifying the degradation of system level of service. Although there have been plenty of studies on the quantitative measure of system resilience, only a few of them consider the unmet demand in the transportation system, specifically for freight transportation system. Nevertheless, the traffic flow assignment mechanism and the strength of capacity constraint of freight transportation are essentially different from those of generalized urban transportation systems.

The present invention provides a novel transportation resilience measure combining total travel time and unmet demand. This measure makes it tractable to reduce not only the total travel time from an efficiency perspective but also the unmet demand in the damaged system from an equity point of view. A solution to the restoration plan problem determines the selection of road sections to be restored after disruptive events. Selection of different road sections leads to different resource consumption for the restoration task and different extent of system performance after restoration. The problem is difficult to solve when there are multiple links damaged simultaneously in a transportation network with complex topology.

In the present invention, the problem is formulated as a bi-level optimization problem. The upper level of the bi-level problem is formulated to maximize the system resilience with the restoration road section selection and capacity recovery level, i.e. resource allocation, as control variables. The lower level problem is formulated as an Elastic-demand UE problem under the control variables determined by upper level problem. The solution variables of the lower level problem serve as input to the upper level problem that are used to quantify the total travel time and the unmet demand in the system. The upper level restoration plan optimization problem is solved by a modified active set algorithm originally applied for NDP. The lower level problem is solved by the network representation method. In order to avoid the confusion of the original link and the pseudo link with same O-D pairs, the typical excess-demand network representation method has been modified.

The exemplary embodiments of the present invention demonstrate the validity, capability, and flexibility of the proposed bi-level optimization model for solving the restoration plan. In the exemplary embodiments, the restoration planning method of the present invention is applied to a typical road network (Sioux-Falls network) to illustrate the implementation procedures and to verify the effectiveness of the method. 15 links are selected as potentially damaged links. 5 sets of experiments were performed with various damaged link numbers ($N_{dam}=1\sim5$), each post-event scenario is randomly selected from $C_{15}^{N_{dam}}$ damaged link combinations. The worst cases and best cases for $N_{dam}=1\sim5$ were discussed from unmet demand, system resilience measure and cost efficiency perspectives. These analyses not only verify the effectiveness of the proposed resilience measure and the bi-level formulation of the problem, but also provide an approach for identifying critical road sections that need extra maintenance attentions and the link combinations with higher cost effectiveness. These results could be of great help for decision makers.

This work could be extended and strengthened in various directions. Firstly, disruptive events with different number of damaged links are generated. The combination of links is of more concern for the system resilience analysis while the capacity degradation ratio is assumed to be homogenous for all damaged links. To consider different damage levels or to involve randomness in the strength of damage will introduce more interesting aspects for both the measure of system resilience and the evaluation of the optimization method. Secondly, it is necessary to evaluate the proposed method on different typical road networks in order to examine the influence of network topology. Last but not the least, the focus on the resilience analysis of transportation system without consideration of their interdependence with other Critical Infrastructures is addressed. It could be an interesting and promising direction to model the interdependence between different CIs and to propose effective decision making support methodologies involving pooling budget and resource constraints.

The present invention may be embodied on various computing platforms that perform actions responsive to software-based instructions. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++ or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A computer-implemented method for generating a restoration work plan following an occurrence of a disruptive event, the method comprising:
    identifying a plurality of damaged links of an urban transportation system, wherein the plurality of damaged links have been damaged following an occurrence of a disruptive event and wherein the urban transportation system comprises a plurality of links representing road sections;
    solving, by one or more processors, a bi-level optimization problem comprising:
        an upper-level problem formulated to maximize a resilience measure of the urban passenger transportation system, wherein the resilience measure comprises total travel time and unmet demand in the urban passenger transportation system following the disruptive event;
        a lower-level problem formulated as an elastic-demand problem comprising an Elastic User Equilibrium (EUE) and subject to one or more control variables determined by the upper-level problem and wherein one or more solution variables of the lower-level problem serve as inputs to the upper-level problem; and
    generating a restoration work plan to reduce both the total travel time and the unmet demand of the resilience measure, the restoration work plan comprising one or more links of the plurality of damaged links to restore following the disruptive event.

2. The method of claim 1, wherein the EUE considers all the drivers' response to restoring the selected one or more links when determining a route in the transportation system.

3. The method of claim 1, wherein the unmet demand is determined to be driver trips that are not able to be served following the occurrence of the disruptive event.

4. The method of claim 1, wherein selecting one or more links of the plurality of links to restore following the disruptive event, wherein the links are selected to reduce both the total travel time and the unmet demand of the resilience measure, further comprises, considering a cost efficiency for restoring the one or more selected links.

5. The method of claim 4, wherein the cost efficiency provides a quantitative measure of the change in resilience measure per cost unit.

6. The method of claim 4, wherein the cost efficiency for restoring the one or more selected links is determined by:

$$E = \frac{R_0 - R_f}{M}$$

wherein, $R_0$ is a resilience measure before the restoration of the selected links and $R_f$ is a resilience measure after the restoration of the selected links and M is a cost of the restoration.

7. The method of claim 3, wherein the unmet demand is determined by:

$$\hat{D} = \sum_{rs} \hat{D}_{rs} \sum_{rs} f_{rs,p}$$

wherein, f is a flow of the driver on a pseudo link between an origin (r) of a trip, and a destination of the trip (s).

8. A non-transitory computer-readable medium, the computer-readable medium having computer-readable instructions stored thereon that, when executed by a computing device processor, cause the computing device to:
    identify a plurality of damaged links of an urban transportation system, wherein the plurality of damaged links have been damaged following an occurrence of a disruptive event and wherein the urban transportation system comprises a plurality of links representing road sections;
    solve a bi-level optimization problem comprising:
        an upper-level problem formulated to maximize a resilience measure of the urban passenger transportation system, wherein the resilience measure comprises total travel time and unmet demand in the urban passenger transportation system following the disruptive event;
        a lower-level problem formulated as an elastic-demand problem comprising an Elastic User Equilibrium (EUE) and subject to one or more control variables determined by the upper-level problem and wherein one or more solution variables of the lower-level problem serve as inputs to the upper-level problem; and
    generate a restoration work plan to reduce both the total travel time and the unmet demand of the resilience measure, the restoration work plan comprising one or more links of the plurality of damaged links to restore following the disruptive event.

9. The non-transitory computer-readable medium of claim 8, wherein the EUE considers all the drivers' response to restoring the selected one or more links when determining a route in the transportation system.

10. The non-transitory computer-readable medium of claim 8, wherein the unmet demand is determined to be driver trips that are not able to be served following the occurrence of the disruptive event.

11. The non-transitory computer-readable medium of claim 8, further causing the computing device to, consider a cost efficiency for restoring the one or more selected links.

12. The non-transitory computer-readable medium of claim 11, wherein the cost efficiency provides a quantitative measure of the change in resilience measure per cost unit.

13. The non-transitory computer-readable medium of claim 11, wherein the cost efficiency for restoring the one or more selected links is determined by:

$$E = \frac{R_0 - R_f}{M}$$

wherein, $R_0$ is a resilience measure before the restoration of the selected links and $R_f$ is a resilience measure after the restoration of the selected links and M is a cost of the restoration.

14. The non-transitory computer-readable medium of claim 10, wherein the unmet demand is determined by:

$$\hat{D} = \sum_{rs} \hat{D}_{rs} \sum_{rs} f_{rs,p}$$

wherein, f is a flow of the driver on a pseudo link between an origin (r) of a trip, and a destination of the trip (s).

15. A system for generating a restoration work plan following an occurrence of a disruptive event, the system comprising:
a processor; and
a non-transitory computer-readable medium operably coupled to the processor, the computer-readable medium having computer-readable instructions stored thereon that, when executed by the processor, cause the system to:
identify a plurality of damaged links of an urban transportation system, wherein the plurality of damaged links have been damaged following an occurrence of a disruptive event and wherein the urban transportation system comprises a plurality of links representing road sections;
solve a bi-level optimization problem comprising;
an upper-level problem formulated to maximize a resilience measure of the urban passenger transportation system, wherein the resilience measure comprises total travel time and unmet demand in the urban passenger transportation system following the disruptive event;
a lower-level problem formulated as an elastic-demand problem comprising an Elastic User Equilibrium (EUE) and subject to one or more control variables determined by the upper-level problem and wherein one or more solution variables of the lower-level problem serve as inputs to the upper-level problem; and
generate a restoration work plan to reduce both the total travel time and the unmet demand of the resilience measure, the restoration plan comprising one or more links of the plurality of damaged links to restore following the disruptive event.

16. The system of claim 15, wherein the EUE considers all the drivers' response to restoring the selected one or more links when determining a route in the transportation system.

17. The system of claim 15, wherein the unmet demand is determined to be driver trips that are not able to be served following the occurrence of the disruptive event.

18. The system of claim 15, wherein the non-transitory computer-readable medium further causing the computing device to, consider a cost efficiency for restoring the one or more selected links.

19. The system of claim 18, wherein the cost efficiency for restoring the one or more selected links is determined by:

$$E = \frac{R_0 - R_f}{M}$$

wherein, $R_0$ is a resilience measure before the restoration of the selected links and $R_f$ is a resilience measure after the restoration of the selected links and M is a cost of the restoration.

20. The system of claim 17, wherein the unmet demand is determined by:

$$\hat{D} = \sum_{rs} \hat{D}_{rs} \sum_{rs} f_{rs,p}$$

wherein, f is a flow of the driver on a pseudo link between an origin (r) of a trip, and a destination of the trip (s).

* * * * *